(12) United States Patent
Farkas et al.

(10) Patent No.: US 9,755,802 B2
(45) Date of Patent: Sep. 5, 2017

(54) METHODS, SYSTEMS, AND COMPUTER PROGRAM PRODUCTS FOR PARAMETER ESTIMATION BASED ON HISTORICAL CONTEXT INFORMATION

(71) Applicant: Collision Communications, Inc., Peterborough, NH (US)

(72) Inventors: Joseph Farkas, Merrimack, NH (US); Brandon Hombs, Merrimack, NH (US); Barry West, Temple, NH (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 28 days.

(21) Appl. No.: 14/036,650

(22) Filed: Sep. 25, 2013

(65) Prior Publication Data

US 2015/0085679 A1   Mar. 26, 2015

(51) Int. Cl.
*H04J 1/16* (2006.01)
*H04L 5/00* (2006.01)

(52) U.S. Cl.
CPC .................. *H04L 5/0051* (2013.01)

(58) Field of Classification Search
CPC .. H04W 24/10; H04W 36/0033; H04L 5/0051
USPC .................................................. 370/252, 338
See application file for complete search history.

(56) References Cited

U.S. PATENT DOCUMENTS

| | | | |
|---|---|---|---|
| 6,625,465 B1* | 9/2003 | Moon et al. ................... | 455/522 |
| 7,486,648 B1* | 2/2009 | Baranowski .................. | 370/338 |
| 8,102,784 B1* | 1/2012 | Lemkin et al. ............... | 370/255 |
| 2005/0163072 A1* | 7/2005 | Park .................... | H04L 12/5693 370/328 |
| 2008/0175185 A1* | 7/2008 | Ji ........................ | H04W 52/243 370/318 |
| 2008/0225811 A1* | 9/2008 | Wentink ................ | H04L 1/1671 370/338 |
| 2010/0157953 A1* | 6/2010 | Christoffersson . | H04W 72/1294 370/336 |
| 2012/0087435 A1* | 4/2012 | Gomadam ........... | H04B 7/0452 375/285 |
| 2013/0308470 A1* | 11/2013 | Bevan et al. ................. | 370/252 |
| 2014/0192673 A1* | 7/2014 | Li et al. ........................ | 370/252 |
| 2014/0211644 A1* | 7/2014 | Giannakis ............. | H04W 16/14 370/252 |

* cited by examiner

*Primary Examiner* — Kan Yuen

(57) ABSTRACT

Methods and systems are described for parameter estimation based on historical context information. In one aspect, a communication context for a first mobile device is determined. The communication context is compared to a stored historical communication context of at least one other mobile device, wherein the stored historical communication context includes at least one of communication parameter estimates, mobile device statistics, mobile device transmit settings, and base station receiver settings. Parameters for communicating with the first mobile device are estimated based on the comparison.

26 Claims, 5 Drawing Sheets

METHODS, SYSTEMS, AND COMPUTER PROGRAM PRODUCTS FOR PARAMETER ESTIMATION BASED ON HISTORICAL CONTEXT INFORMATION

BACKGROUND

Wireless communication networks are utilized to provide various communication services such as voice, video, packet data, messaging, and broadcast. These wireless networks may be multiple-access networks capable of supporting multiple users by sharing the available network resources. A wireless communication network may include a number of base stations that can support communication for a number of user equipment (UE) or mobile computing devices. Mobile computing devices may communicate with a base station via a downlink and uplink. The downlink refers to the communication link from the base station to the mobile computing device, and the uplink refers to the communication link from the mobile computing device to the base station.

A base station may transmit data and control information on the downlink to a mobile computing device and/or may receive data and control information on the uplink from the mobile computing device. Communication receivers typically employ parameter estimation to estimate certain required parameters for the rest of the receiver to function properly. Pilot sequences, which are sequences already known to the receiver, are used to obtain the parameter estimates. The parameters that are estimated vary per system and receiver but often include things like, channel estimates, receiver power estimates, phase, timing, and frequency.

Limitations of current parameter estimation include a decrease in performance due to error in the parameter estimates, a large amount of overhead associated with using the pilot sequences, and high parameter estimation implementation resource requirements.

Many of these limitations can be overcome by leveraging previous parameter estimates of one or more other mobile devices. Accordingly, there exists a need for methods, systems, and computer program products for parameter estimation based on historical context information.

SUMMARY

Methods and systems are described for parameter estimation based on historical context information. In one aspect, a communication context for a first mobile device is determined. The communication context is compared to a stored historical communication context of at least one other mobile device, wherein the stored historical communication context includes at least one of communication parameter estimates, mobile device statistics, mobile device transmit settings, and base station receiver settings. Parameters for communicating with the first mobile device are estimated based on the comparison.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
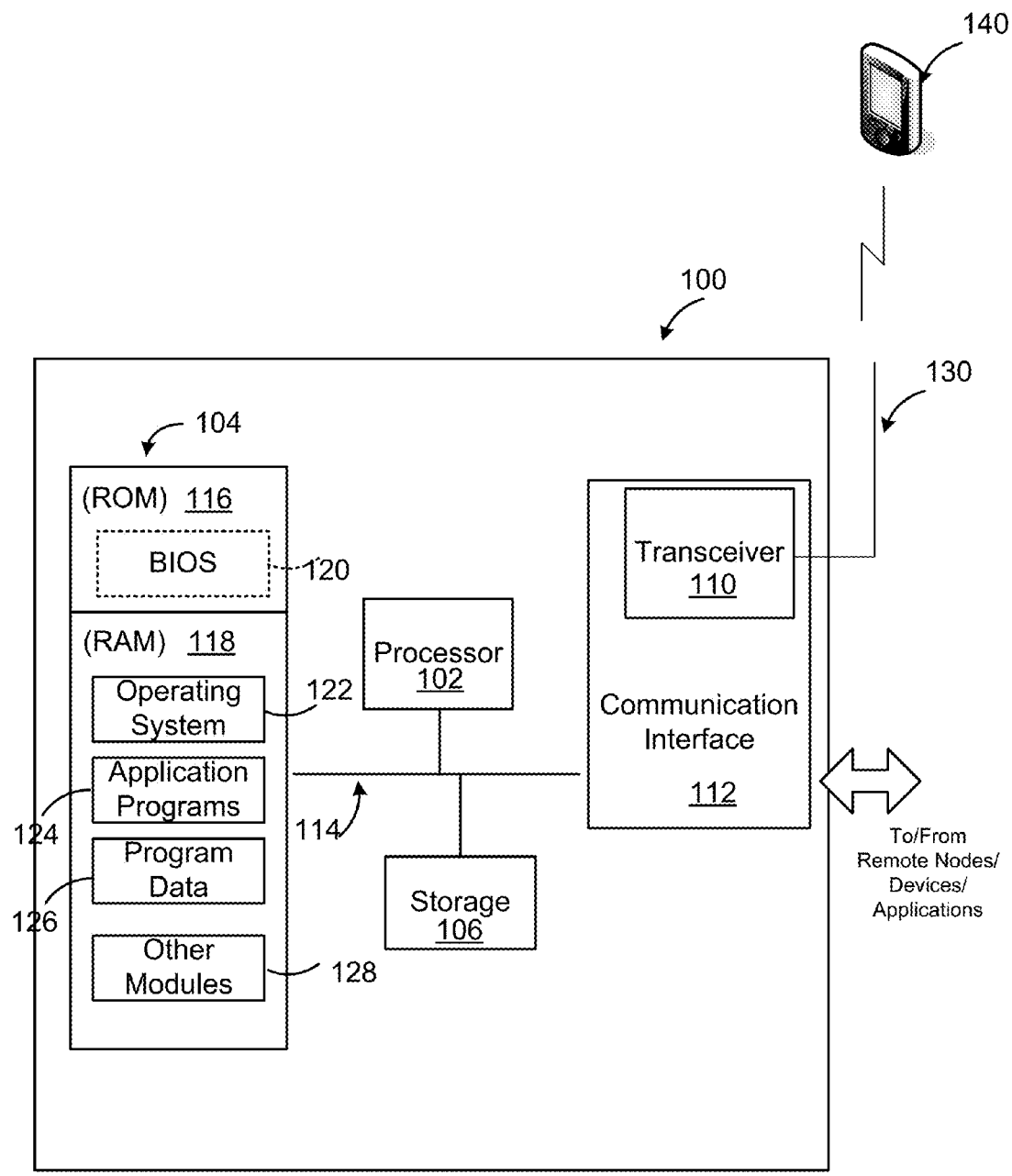
FIG. 1 is a block diagram illustrating an exemplary hardware device in which the subject matter described herein may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station (not shown) configured to communicate with mobile devices 140 in a communication network. A base station may also be referred to as an enodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices 140 via a transceiver 110 connected to an antenna 130. The mobile devices 140 can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
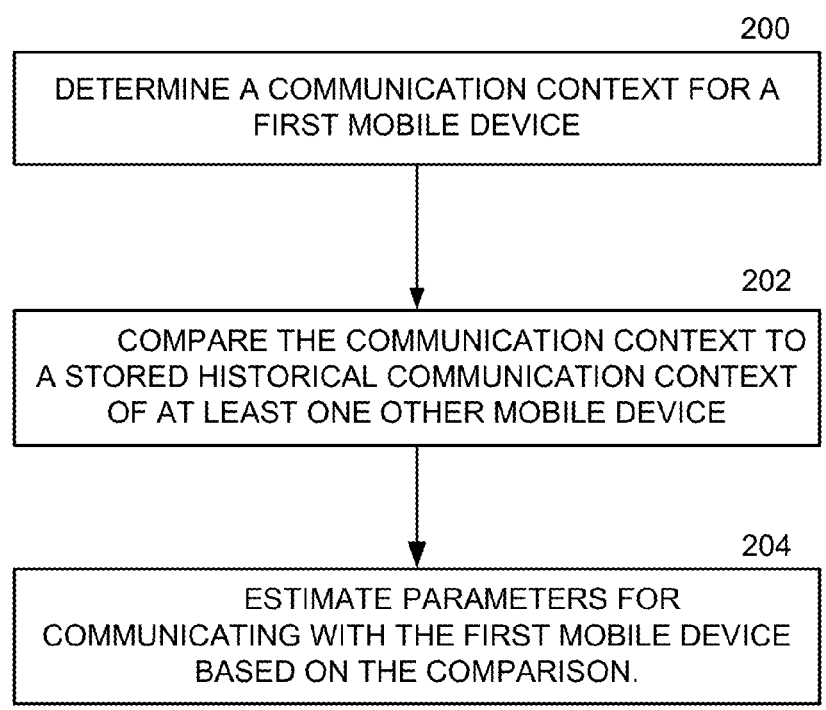
FIG. 2 is a flow diagram illustrating a method for parameter estimation based on historical context information according to an aspect of the subject matter described herein.
Figure 3:
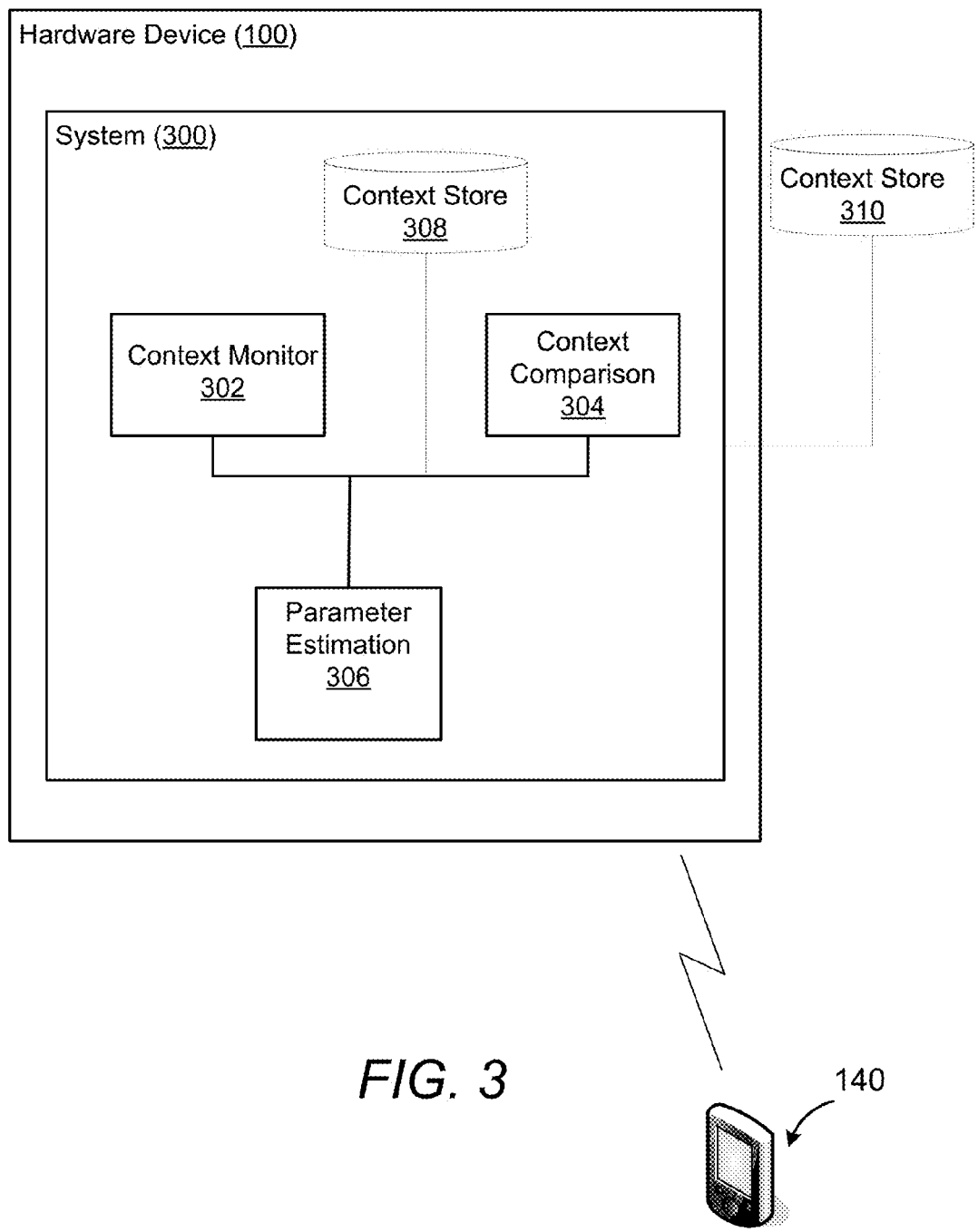
FIG. 3 is a block diagram illustrating a system for parameter estimation based on historical context information according to an aspect of the subject matter described herein.

Turning now to FIG. 2, a flow diagram is shown illustrating a method for parameter estimation based on historical context information according to an exemplary aspect of the subject matter described herein. FIG. 3 is a block diagram illustrating an arrangement of components for parameter estimation based on historical context information according to another exemplary aspect of the subject matter described herein. The arrangement of components in FIG. 3 may be implemented and/or hosted by some or all of the components of the hardware device 100 of FIG. 1. The method in FIG. 2 can be carried out by, for example, some or all of the components illustrated in the exemplary arrangement in FIG. 3 operating in a compatible execution environment, such as the environment provided by some or all of the components of the arrangement in FIG. 1.

With reference to FIG. 2, in block 202 a communication context for a first mobile device is determined. Accordingly, a system for parameter estimation based on historical context information includes means for determining a communication context for a first mobile device. For example, as illustrated in FIG. 3, a context monitor component 304 is configured to determine a communication context for a mobile device 140. The communication context includes, for example, communication parameter estimates, mobile device statistics, mobile device transmit settings, and/or base station receiver settings.

Communication parameter estimates can include delay spread, channel taps, channel power, received signal strength, number of channel taps, channel coherence time, and channel coherence bandwidth. These estimates can be initially determined using, for example, traditional parameter estimation techniques for communications between a base station including hardware device 100 and a mobile device 140.

Mobile device statistics can include signal to noise ratio, signal to interference plus noise ratio, interference plus noise ratio, bit error rate, channel bit error rate, packet error rate, and/or block error rate. Mobile device transmit settings can include transmit power, bandwidth, modulation, coding, spreading length, spreading code, scheduling, power control, beam patterns, and/or precoding matrices. These settings are used by the mobile device 140 during communications between, for example, a base station including hardware device 100 and a mobile device 140.

Base station receiver settings comprise at least one of receiver algorithm selection and/or receiver parameter settings. Base station receiver algorithm selection involves selecting between multiple receiver algorithms that perform similar, alternative, functions. For example, a selection between two different parameter estimation algorithms can be made, where one may perform better than the other under certain circumstances. In an aspect, selection of a base station receiver algorithm may lead to other settings and mobile device statistics changing, and the communication context can include the algorithm selection and the changed settings. Similarly, receiver algorithm settings and/or receiver parameter settings may lead to other settings and mobile device statistics changing, and the communication context can include the receiver algorithm settings and/or receiver parameter settings and the changed settings.

In one aspect, the communication context can include a location of a mobile device 140, a velocity of a mobile device 140, and/or an acceleration of a mobile device 140. For example, the mobile device 140 can include location determining means, such as global positioning system (GPS) capabilities, to provide a location of the mobile device 140. A location of the mobile device can be determined using other methods, such as triangulation. Similarly, the mobile device 140 can include velocity determining means based on GPS or other location determining means changing over time. The mobile device 140 can include acceleration determining means, such as an accelerometer.

Any combination of the above settings and estimates can make up a communication context for the mobile device 104 that is monitored by context monitor 302.

Returning to FIG. 2, in block 204 the communication context is compared to a stored historical communication context of at least one other mobile device. Accordingly, a system for parameter estimation based on historical context information includes means for comparing the communication context to a stored historical communication context of at least one other mobile device. For example, as illustrated in FIG. 3, a context comparison component 304 is configured to compare the communication context to a stored historical communication context of at least one other mobile device.

The stored historical communication context is prior communication contexts, such as communication parameter estimates, mobile device statistics, mobile device transmit settings, and/or base station receiver settings, that have been monitored by context monitor 302 and stored in a local context store 308 and/or a remote context store 310. Note that context stores 308 and 310 are illustrated as optional components of system 300 because, while system 300 accesses one or more of the context store(s) 308 and 310 for comparison purposes, the context stores 308 and 310 may or may not be part of system 300.

Figure 4:
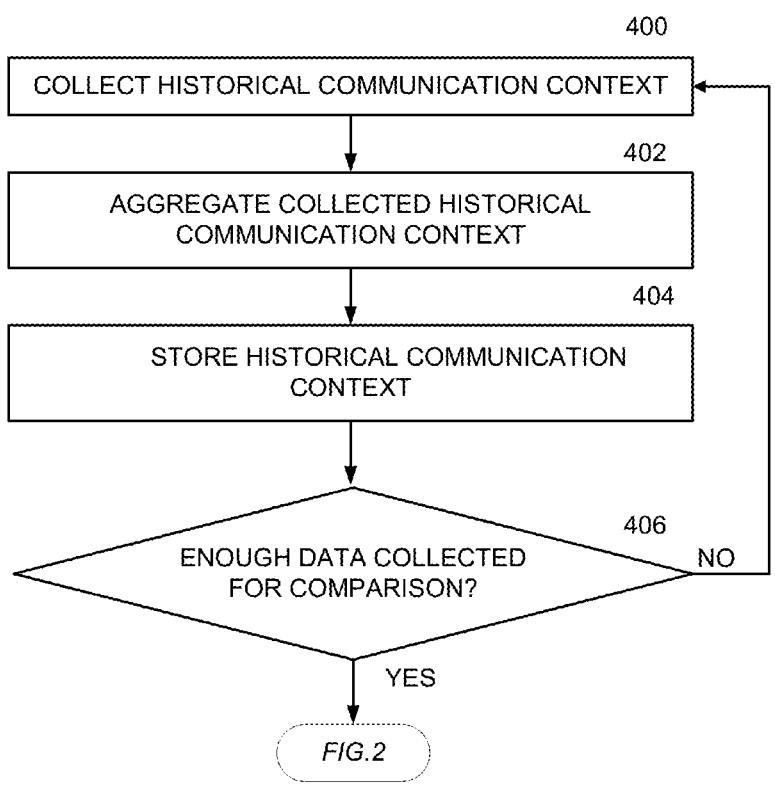
FIG. 4 is a flow diagram illustrating a method of collecting and storing historical communication context information.

FIG. 4 is a flow diagram illustrating one method of collecting and storing historical communication context information. Historical communication context information is collected in block 400. In one aspect, the historical communication context can be obtained by monitoring and storing communication context for one or more active mobile devices, using a drive test, in which test equipment is moved through an area and communications are monitored, and/or using a test mobile device specifically designed for the purpose. The collected historical communication context can be aggregated (block 402) and stored (block 404). In one aspect, historical communication context can be aggregated and stored for at least one of intra-cell and inter-cell mobile devices. In another aspect, the stored historical communication context includes a sequence of historical communication contexts. For example, the sequence of historical communication contexts can include a collection of one or more of communication parameter estimates, device statistics, device transmit settings, and base station receiver settings. The stored historical communication context can include a sequence of previous communication contexts for a particular mobile device 104 or for multiple mobile devices related based on some aspect of the communication context or by another aspect.

The sequence of parameter estimates can be used to predict future parameter estimates. For example, the historical communication context can show patterns of how one or more previous estimates together yield future parameters and may be combined with other known information or not to enhance the estimates further. The collected data is processed to look for these patterns.

Various processing techniques may be employed and may, for example, fall under the "Big Data" category of suggested processing technology. Here, the term "Big Data" refers to any technique that is used to process large data sets. Big Data may include one or more of A/B testing, association rule learning, classification, cluster analysis, crowdsourcing, data fusion and integration, ensemble learning, genetic algorithms, machine learning, natural language processing, neural networks, pattern recognition, anomaly detection, predictive modeling, regression, sentiment analysis, signal processing, supervised and unsupervised learning, simulation, time series analysis, and visualization. As an output of the "Big Data" analysis one or more of the input metrics will be key metrics and have a mapping between those input metrics and the parameter estimates. When context monitor 302 receives new information under normal operations, these input metrics will be used to update the parameter estimates. It is possible, but not required, that the parameter estimates are combined with parameters estimated from pilot sequences to augment the parameter estimates.

Once enough data is collected (block 406), the data can be used for estimating parameters of current mobile devices according to the method illustrated in FIG. 2 and described herein.

Returning to FIG. 2, in block 206 parameters for communicating with the first mobile device are estimated based on the comparison. Accordingly, a system for parameter estimation based on historical context information includes means for estimating parameters for communicating with the first mobile device based on the comparison. For example, as illustrated in FIG. 3, a parameter estimation component 306 is configured to estimate parameters for communicating with the first mobile device based on the comparison.

In one aspect, the parameter estimation component 306 is configured to determine future predictions of communication parameter estimates, mobile device statistics, mobile device transmit settings, and/or base station receiver settings based on the estimated parameters for communicating with the first mobile device. For example, the parameter estimation component 306 is configured to estimate delay spread, channel taps, channel power, received signal strength, number of channel taps, channel coherence time, and/or channel coherence bandwidth, for communicating with the first mobile device.

This approach can lead to minimizing the overhead of pilot sequences, improving parameter estimation accuracy, and/or reducing parameter estimation computational complexity based on the stored historical communication context. Minimizing the number of pilot sequences needed results in a reduction in overhead and hence increased throughput. Improving parameter estimation accuracy also results in improved performance. Reducing the complexity of parameter estimation algorithms reduces the amount of resources that must be dedicated to parameter estimation algorithms.

Moreover, the future predictions can help improve performance in various other ways generally by being proactive rather than being reactive. For example, the future possible spectral efficiency of an active mobile device can be predicted and the mobile device scheduled accordingly. The interference coming from neighboring cells can be predicted and that information used to change spectral efficiency of active users connected to the cell, reschedule active users, and/or change receiver algorithms/settings.

Figure 5:
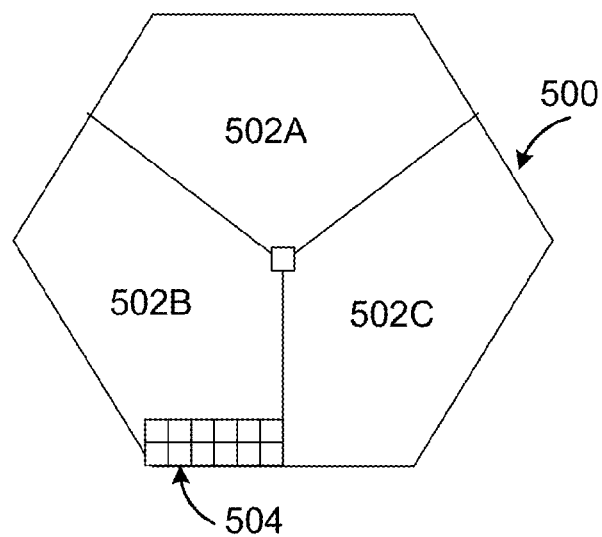
FIG. 5 is a block diagram illustrating a cell in a cellular communications system.

Parameter estimation based on historical context information can also leverage the fact that most parameter estimates come from physical features. In one aspect, the historical context information includes a physical location of a mobile device. As shown in FIG. 5, a cell 500 can be divided into multiple sectors 502A-C and further divided into regions 504. When a mobile device is determined to be in region 504 using any of the location determination techniques described above, historical context information for other mobile devices previously in region 504 can be used to estimate parameters for communicating with the mobile device.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on"

and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for parameter estimation in a wireless communication network based on historical context information, the method comprising:
   determining a communication context for a first mobile device, wherein the determined communication context includes a determined current location of the first mobile device within a portion of a cell of the communications system and at least one of communication parameter estimates, mobile device statistics, mobile device transmit settings, and base station receiver settings;
   comparing the communication context to a stored historical communication context of at least one other mobile device that was determined to previously be located in the portion of the cell, wherein the stored historical communication context includes at least one of communication parameter estimates, mobile device statistics, mobile device transmit settings, and base station receiver settings;
   estimating parameters for communicating with the first mobile device based on the comparison; and
   communicating with the first mobile device using the estimated parameters.

2. The method of claim 1 wherein the communication parameter estimates comprises at least one of: delay spread, channel taps, channel power, received signal strength, number of channel taps, channel coherence time, and channel coherence bandwidth.

3. The method of claim 1 wherein the mobile device statistics include at least one of signal to noise ratio, signal to interference plus noise ratio, interference plus noise ratio, bit error rate, channel bit error rate, packet error rate, and block error rate.

4. The method of claim 1 wherein the mobile device transmit settings comprise at least one of transmit power, bandwidth, modulation, coding, spreading length, spreading code, scheduling, power control, beam patterns, and precoding matrices.

5. The method of claim 1 wherein the base station receiver settings comprise at least one of receiver algorithm selection and receiver parameter settings.

6. The method of claim 1 wherein the stored historical communication context includes a sequence of historical communication contexts.

7. The method of claim 6 wherein the sequence of historical communication contexts includes a collection at least one of communication parameter estimates, device statistics, device transmit settings, and base station receiver settings.

8. The method of claim 1 comprising obtaining the stored historical communication context via at least one of a drive test, a test mobile device, and one or more active mobile devices.

9. The method of claim 1 comprising storing historical communication context for at least one of intra-cell and inter-cell mobile devices.

10. The method of claim 1 comprising at least one of minimizing the overhead of pilot sequences, improving parameter estimation accuracy, and reducing parameter estimation computational complexity based on the stored historical communication context.

11. The method of claim 1 wherein estimating parameters for communicating with the first mobile device includes estimating at least one of delay spread, channel taps, channel power, received signal strength, number of channel taps, channel coherence time, and channel coherence bandwidth.

12. The method of claim 1 comprising making future predictions of at least one of communication parameter estimates, mobile device statistics, mobile device transmit settings, and base station receiver settings based on the estimated parameters for communicating with the first mobile device.

13. The method of claim 1 wherein the stored historical communication context includes at least one of a velocity of the mobile device and an acceleration of the mobile device.

14. A system for parameter estimation in a wireless communication network based on historical context information, the system comprising system components including:
   a context monitor component configured for determining a communication context for a first mobile device, wherein the determined communication context includes a determined current location of the first mobile device within a portion of a cell of the communications system and at least one of communication parameter estimates, mobile device statistics, mobile device transmit settings, and base station receiver settings;
   a context comparison component configured for comparing the communication context to a stored historical communication context of at least one other mobile device that was determined to previously be located in the portion of the cell, wherein the stored historical communication context includes at least one of communication parameter estimates, mobile device statistics, mobile device transmit settings, and base station receiver settings; and
   a parameter estimation component configured for estimating parameters for communicating with the first mobile device based on the comparison; and
   a transceiver for communicating with the first mobile device using the estimated parameters;
   wherein the system components include at least a processing unit and memory configured to determine the communication context, compare the communication context, and estimate the parameters.

15. The system of claim 14 wherein the communication parameter estimates comprises at least one of: delay spread, channel taps, channel power, received signal strength, number of channel taps, channel coherence time, and channel coherence bandwidth.

16. The system of claim 14 wherein the mobile device statistics include at least one of signal to noise ratio, signal to interference plus noise ratio, interference plus noise ratio, bit error rate, channel bit error rate, packet error rate, and block error rate.

17. The system of claim 14 wherein the mobile device transmit settings comprise at least one of transmit power, bandwidth, modulation, coding, spreading length, spreading code, scheduling, power control, beam patterns, and precoding matrices.

18. The system of claim 14 wherein the base station receiver settings comprise at least one of receiver algorithm selection and receiver parameter settings.

19. The system of claim 14 wherein the stored historical communication context includes a sequence of historical communication contexts.

20. The system of claim 19 wherein the sequence of historical communication contexts includes a collection at least one of communication parameter estimates, device statistics, device transmit settings, and base station receiver settings.

21. The system of claim 14 comprising a historical communication context storage configured for storing one or more historical communication contexts obtained via at least one of a drive test, a test mobile device, and one or more active mobile devices.

22. The system of claim 14 comprising a historical communication context storage configured for storing one or more historical communication contexts for at least one of intra-cell and inter-cell mobile devices.

23. The system of claim 14 wherein the parameter estimation component is configured to estimate parameters including at least one of delay spread, channel taps, channel power, received signal strength, number of channel taps, channel coherence time, and channel coherence bandwidth, for communicating with the first mobile device.

24. The system of claim 14 wherein the parameter estimation component is configured to determine future predictions of at least one of communication parameter estimates, mobile device statistics, mobile device transmit settings, and base station receiver settings based on the estimated parameters for communicating with the first mobile device.

25. The system of claim 14 wherein the context comparison component is configured to compare the stored historical communication context to at least one of a velocity of the mobile device and an acceleration of the mobile device.

26. A non-transitory computer readable medium storing a computer program, executable by a machine, for parameter estimation in a wireless communication network based on historical context information, the computer program comprising executable instructions for:
determining a communication context for a first mobile device, wherein the determined communication context includes a determined current location of the first mobile device within a portion of a cell of the communications system and at least one of communication parameter estimates, mobile device statistics, mobile device transmit settings, and base station receiver settings;
comparing the communication context to a stored historical communication context of at least one other mobile device that was determined to previously be located in the portion of the cell, wherein the stored historical communication context includes at least one of communication parameter estimates, mobile device statistics, mobile device transmit settings, and base station receiver settings; and
estimating parameters for communicating with the first mobile device based on the comparison; and
communicating with the first mobile device using the estimated parameters.

* * * * *